United States Patent

[11] 3,595,199

| | | |
|---|---|---|
| [72] | Inventor | Juan Faxas<br>Central Aguirre, P.R. |
| [21] | Appl. No. | 886,804 |
| [22] | Filed | Dec. 19, 1969 |
| [45] | Patented | July 27, 1971 |

[54] JET PROPULSION SYSTEM FOR AMPHIBIOUS VEHICLE
12 Claims, 6 Drawing Figs.

[52] U.S. Cl. .................................................. 115/1
[51] Int. Cl. .................................................. B63f 3/00
[50] Field of Search ........................................ 115/1

[56] References Cited
UNITED STATES PATENTS
2,979,016  4/1961  Rossi ............................ 115/1

*Primary Examiner*—Andrew H. Farrell
*Attorney*—Sidney W. Russell

ABSTRACT: A jet propulsion system for amphibious vehicles characterized in that the pump or pumps are located externally of the hull. The aft and/or forward drive wheels of the vehicle are modified so that their hub plates function as axial flow pumps which discharge parallel to the axle and thence into respective drumlike pressure casings which are provided with rearwardly directed jet discharge orifices. The pressure casings can be rotated the desired degree in the vertical plane which in turn controls the angle of jet discharge relative to the horizontal. This capability affords optimum planing characteristics during water borne travel, assists in effecting transition from water onto a steep bank, and enables the vehicle to be easily rocked free should it become bogged down in mud.

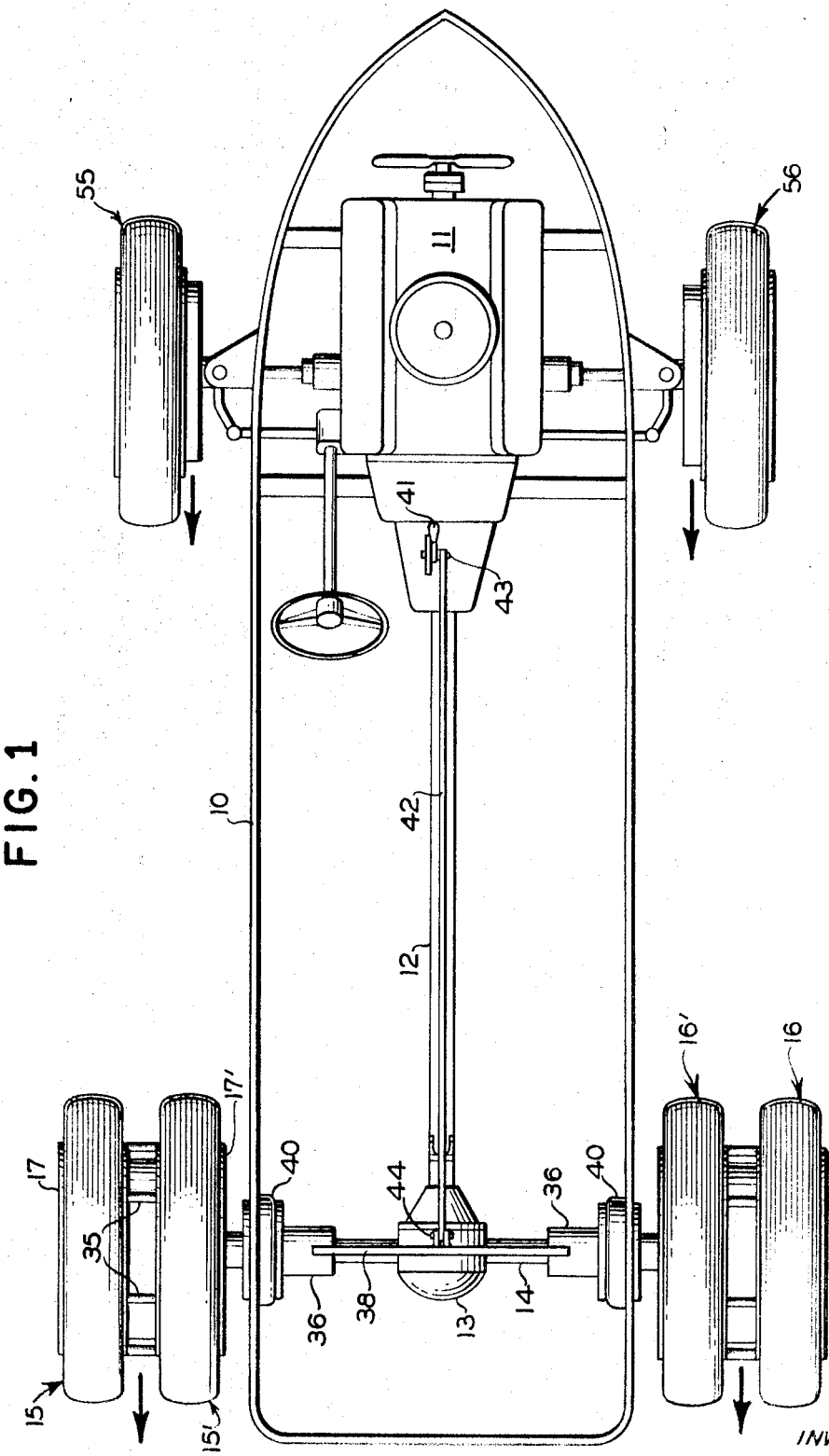

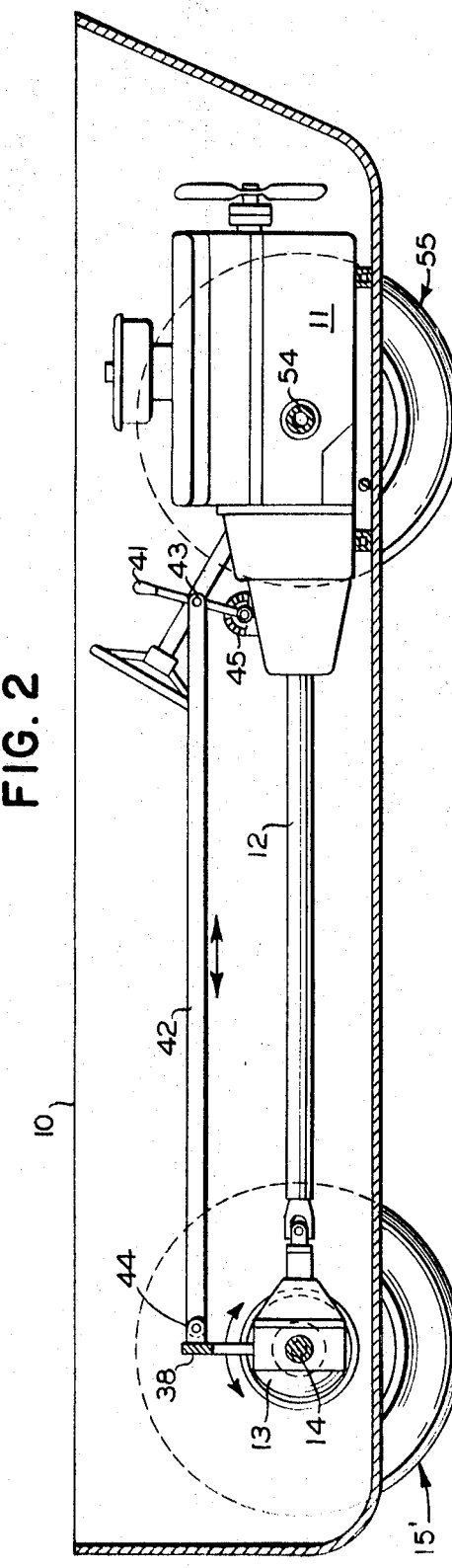
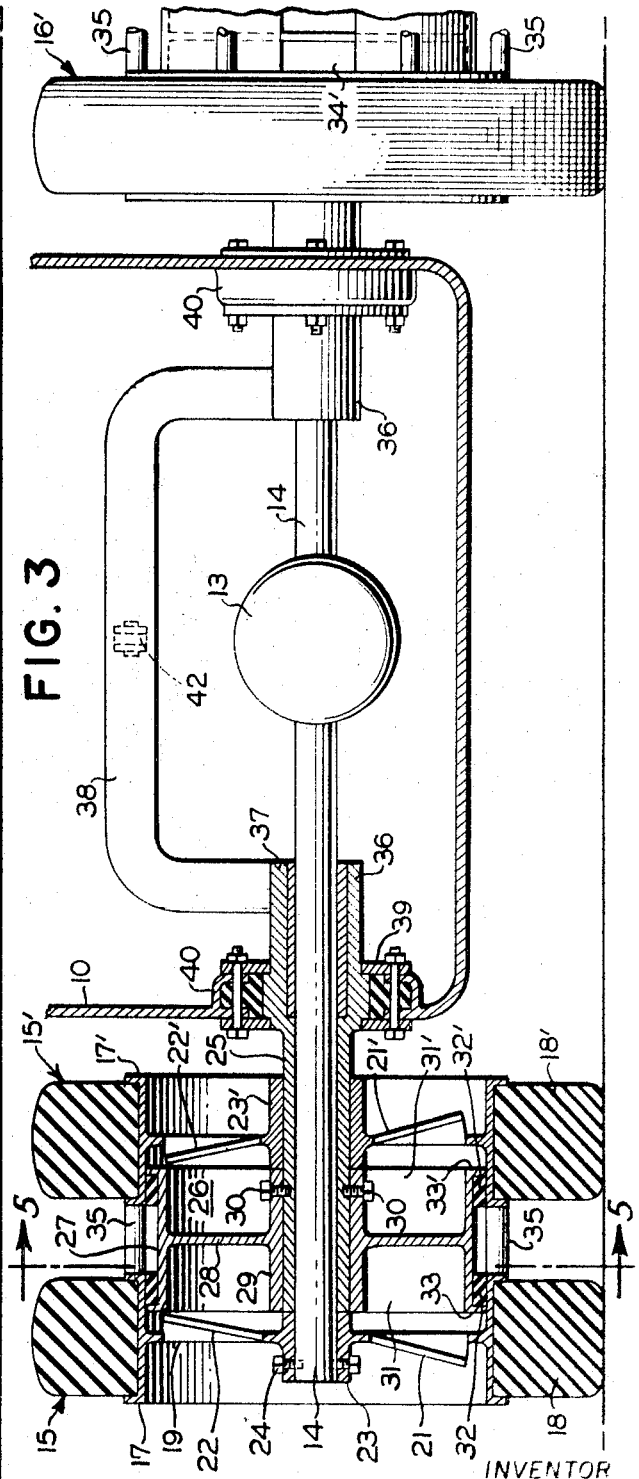

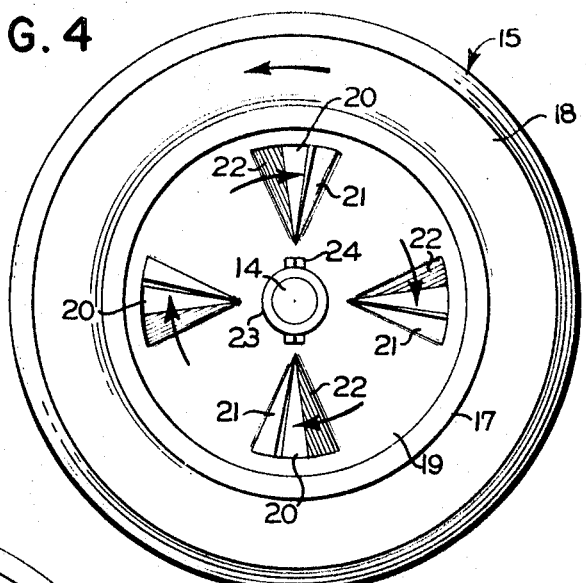
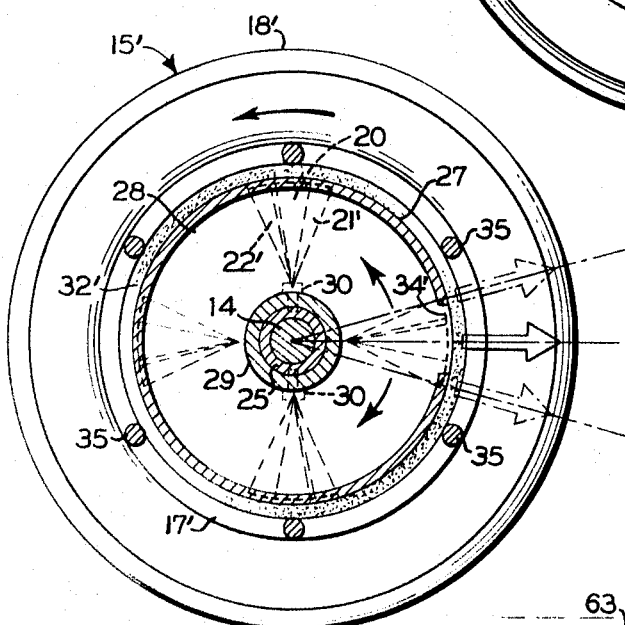
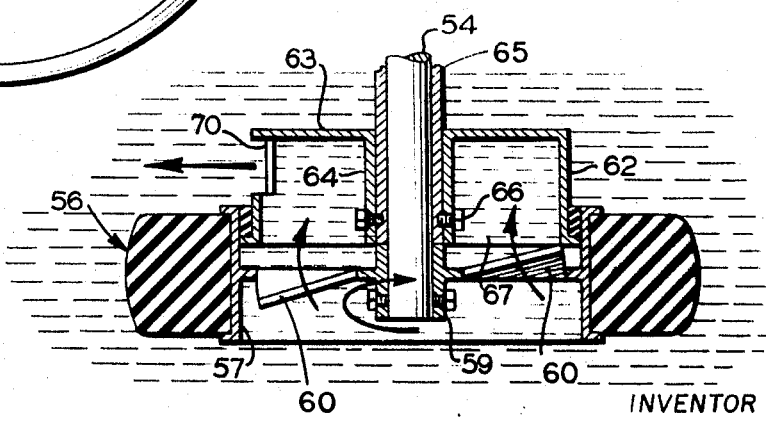
FIG. 4
FIG. 5
FIG. 6
INVENTOR
JUAN FAXAS
BY *Sidney W. Russell*
ATTORNEY

JET PROPULSION SYSTEM FOR AMPHIBIOUS VEHICLE

BACKGROUND OF INVENTION AND PRIOR ART

Hydroreactive propulsion systems for amphibious vehicles heretofore suggested or in prior use fall into two general categories: those utilizing a water jet or array of jets, and those utilizing the vehicular land wheels themselves as water borne motive means which, in such instance, are fitted with vanes, paddles or the like and furnish a net forward thrust by direct reaction against the water in the manner of a paddle wheel. Jet-powered land-and-water vehicles typically utilize one or more centrifugal pumps which are mounted within the vehicle hull and are driven by the same engine which is otherwise employed for land travel. These designs require a system of intake and discharge ducts, auxiliary drive shafts and change gears. Taking into account the size and weight of pumps, ductwork and appurtenant apparatus, it is apparent that such units pose distinct disadvantages in that the effective passenger and cargo space is reduced while gross weight, complexity and cost remain substantial. Amphibious craft equipped with vane or paddle wheel drive avoid some of these problems but engender others. For one thing, vaned wheel systems are notoriously inefficient—due principally to hydraulic drag upon return travel of the rotating element—so that it is necessary to design the vehicle such that when underway, the wheels are only partially submerged, and the less submergence the better. In the context of military use, such craft offer a high silhouette target, increasing exposure to enemy fire. Another disadvantage of vaned wheel drives is that it is very difficult to obtain and to control the proper degree of planing, i.e., the lifting of the bow, which, of course, is well known to those skilled in the marine arts as being desirable to minimize resistance to forward motion. While a number of buoyant wheel/propeller designs have been proposed as a means of solving the planing problem, they have proven less than compatible with the concurrent requirements of a rugged land wheel.

SUMMARY OF THE INVENTION

My invention, simple in design and execution, avoids the aforesaid disadvantages of prior art hydroreactive drive systems and, in addition, affords a number of distinct improvements thereover. Among the more important objects and advantages are: utilization of controlled water jets as the ultimate prime motive force when waterborne; elimination of onboard pumps; elimination of long runs of ductwork with attendant minimization of pressure drop; utilization of drive wheels as axial flow impellers which present minimum resistance to forward motion without compromising the basic requirements needed for a heavy duty land wheel; ready attainment and control of optimum planing angle; improved ability to negotiate steep banks; rocking capability in the event the vehicle runs aground amidships or becomes bogged in mud; and, in connection with military applications, the provision of a low-silhouette target.

Briefly stated, my invention involves the concept of using one or more drive wheels or, preferably, pairs of opposing drive wheels, as axial flow impellers whereby water can be forced laterally, inwardly or outwardly as the case may be, through the drive wheel in a flow direction which is parallel to the axle. It is then necessary to alter the direction of flow approximately 90° so that the water can be discharged rearwardly as a high-velocity jet. To effectuate this latter concept, I provide an apertured pressure chamber or casing disposed on the side of the wheel opposite from the impeller inlet to receive the lateral flow from the impeller and then discharge the water from the casing rearwardly through an orifice or nozzle. My invention finds its principal utility in connection with tire vehicles (having either pneumatic or solid tires) although in certain cases it may be used with track-laying vehicles. More particularly, the invention may be adapted to a single rear drive wheel, to double tandem rear drive wheels, to a front drive wheel or to any combination of these including vehicles having two, four, six or more drive wheels of either the single or the tandem types.

My invention has two basic forms: a single-chamber pressure casing for use with a single drive wheel; and a double chamber pressure casing for use with tandem double drive wheels, in which latter event both wheels are designed as axial flow pumps but with laterally opposing flow.

In one embodiment, the propulsion means of my invention comprises a vehicle wheel including a tire and a central hub portion; a driven axle member operatively associated with said wheel; means connecting said wheel with said axle member; said hub portion being constructed and arranged to form an axial flow impeller means in the annular space between said tire and said axle whereby, when said hub portion is submerged in water and said wheel is rotated in a given direction, water will be drawn in from one side of the wheel and discharged to the other side thereof and into a pressure casing member positioned on said other side of the wheel, said casing member having (a) an at least partially open end which is closely adjacent to and in fluid communication with said impeller means, (b) a peripheral wall encompassing the axis of rotation of said wheel and (c) a closed end spaced from said open end; a jet discharge opening in said peripheral wall facing in a generally rearward direction relative to the line of travel of said vehicle; and means connecting with and supporting said casing member such that the latter is fixedly positioned independent of the rotation of said axle member and said wheel.

Another embodiment of my invention is directed to the combination of a first vehicle wheel including a tire and a central hub portion; a driven axle member connecting with the center of said first wheel; a tube member coaxial with and slip fitted over said axle member; a second vehicle wheel including a tire and a central hub portion journaled to said tube member and spaced inwardly from said first wheel; strut means connecting said first and second wheels whereby rotation of the first wheel will effect rotation of the second wheel; the hub portion of said first wheel being constructed and arranged to form a first axial flow impeller means in the annular space between said tire and said axle whereby, when said hub portion is submerged in water and said first wheel is rotated in a given direction, water will be drawn in from the outside of said first wheel and discharged to the inside thereof and into a pressure casing member as hereinafter defined; the hub portion of said second wheel being constructed and arranged to form a second axial flow impeller means in the annular region between said tire and said tube member whereby, when said hub portion is submerged in water and said wheel is rotated in the same direction as said first wheel, water will be drawn in from the inside of said second wheel and discharged to the outside thereof and into said pressure casing member which is positioned between said first and second wheels and supported by and fixedly connected to said tube member, said casing member having (a) at least partially open ends which are closely adjacent to and in fluid communication with said first and second impeller means respectively, (b) a peripheral wall encompassing said tube and axle members and (c) a transverse baffle member extending across the interior of said casing member dividing the latter into two separate chambers; two jet discharge openings in said peripheral wall spaced apart on either side of said baffle member each communicating with a respective one of said chambers and facing in a generally rearward direction relative to the line of travel of said vehicle; and jet elevation control means operatively connecting with said tube member to effect incremental predetermined rotation of the latter which in turn varies the angular position of said casing member whereby the direction of jet discharge from said openings may be elevated above the horizontal and/or depressed below the horizontal.

In order to cause a drive wheel to function as an axial flow machine, the central hub plate of the wheel is specially modified to form an axial flow impeller or a mixed axial-radial flow impeller, both of which configurations are herein intended to be included within the term "axial flow." Any of numerous impeller designs known to those skilled in the pump art may be employed and are included within the scope of the invention. One suitable arrangement is to provide the hub plate with a plurality of radially extending slots having vaned members extending along the radial edges, the vanes being alternately inclined inwardly and outwardly. The degree of vane inclination and vane area are designed so that longitudinal reaction against the water, i.e., hydraulic drag or counter reaction in the direction of vehicle movement, is very slight. Considering a free body diagram of only the wheel-impeller combination, most of the reactive force is transverse and is balanced by a tensile force in and along the axle. For this reason, as well as to equalize the turning moment induced by the jet, it is distinctly preferred to employ at least two impeller-casing units disposed on opposite sides of the vehicle and about a common axis of revolution; the tensile forces then cancel out and the net turning moment acting on the vehicle is substantially zero. It is contemplated that the draft of the vehicle will be such that the wheels, or at least the central hub portions thereof encompassing the impeller means, will normally be completely submerged or substantially so, both when the craft is floating at rest and also when underway. However, where desired, the hull design and buoyancy factors can be correlated such that the impeller portions of the drive wheels are only partially submerged, providing that appropriate means are included to prevent the pumps from becoming airlocked.

A distinctly preferred embodiment of my invention provides a means to vary the angular position of the pressure casing member whereby the direction of discharge from a jet opening may be elevated above the horizontal and/or depressed below the horizontal. By the term "angular position" is meant the angular displacement of the casing, measured in degrees or radians, relative to the wheel axis of rotation and the horizontal plane. Thus, the jet discharge orifice may be rotated any preselected increment away from the horizontal up to +90° (orifice pointing straight up) or up to −90° (orifice pointing straight down). When the orifice is inclined upwardly but less than +90°, the thrust vector is forwardly and downwardly. Assuming this vector be applied aft of the center of gravity of the craft, as by use of a rear drive unit, the stern of the craft will be depressed. Thus, the planing angle can be controlled by varying the angular position of the pressure casing. On the other hand, when the orifice is inclined downwardly but less than −90°, the thrust vector is forwardly and upwardly. Assuming this vector be applied forward of the center of gravity of the craft, as by use of a forward drive unit, this will assist the rear drive unit in obtaining optimum plane. Also, when it is desired to make a transition form water onto a steep river bank, for example, substantial depression of the stern and elevation of the bow will make it easier for the front tires to gain traction. The system of my invention is particularly well suited for freeing the vehicle should it, while water borne, become bogged in mud or run aground. In such circumstance, the operator need only oscillate the rear and/or forward jets above and below the horizontal to impart a pitching or rocking movement to the craft which, together with some net forward thrust, will enable the craft to clear the obstruction. It is also within the scope of the invention to provide for a full or substantially full rotation of the pressure casing, i.e., up to about 360°, so that the jets may be forwardly directed and therefore act to brake the craft.

My invention may be more clearly understood upon reference to the accompanying drawings and the detailed description to follow.

DESCRIPTION OF DRAWINGS

FIG. 1 is a plan view of a typical amphibious vehicle embodying the invention.
FIG. 2 is an elevation view of the vehicle.

FIG. 3 is a sectional end view of the vehicle in which the pressure casing comprises double chambers in combination with dual drive wheels.
FIG. 4 is an enlarged side elevation view of the outboard drive wheel of FIG. 3.
FIG. 5 is an enlarged sectional elevation view taken along line 5-5 of FIG. 3.
FIG. 6 is a sectional plan view of a single pressure chamber construction in combination with a single drive wheel employed, for example, in a front drive unit.

DETAILED DESCRIPTION OF INVENTION

With reference to FIGS. 1 and 2, there is illustrated a four-wheel drive vehicle comprising a watertight body or hull 10 and a front mounted engine 11. The rear drive wheels are of the double-wheeled tandem type, denoted by 15, 15' and 16, 16'. The front drive wheels are single wheels, denoted by 55, 56. Each of the wheels is provided with an impeller-pressure casing unit according to the invention. Power is transmitted from the engine to the rear wheels through a conventional drive shaft 12 and differential 13 to rear axle 14.

As best seen in FIGS. 3 and 4, the left outboard wheel 15 is comprised of a wheel rim 17 upon which is mounted a mud tire 18. A hub plate 19 extends from an axle-receiving hub 23 to rim 17. Wheel 15 is fixedly secured to the driven axle 14 by lock screws 24. As shown in FIG. 4, there is formed in hub plate 19 a plurality of radially extending T-shaped cuts 20; in this example there are four such cuts spaced 90° apart. The leading edges of the cuts are bent slightly inwardly to form vanes 21. The trailing edges of the cuts are bent slightly outwardly to form vanes 22. Vanes 21 and 22 do not project laterally beyond the exterior of rim 17. The combination of rim 17, openings 20 and vanes 21, 22 provides a shrouded form of axial flow impeller whereby, when the hub portion is submerged in water and wheel 15 is rotated in the direction indicated in FIG. 4, water will be drawn in from the outside of wheel 15 and discharged to the inside thereof.

Again with reference to FIG. 3, an elongated sleeve or tubular member 25 is coaxially slip-fitted over axle 14. Said axle is thus free to rotate within tube 25. The purpose of tube 25 is to provide a means for supporting the pressure casing 26, hereinafter described, as well as to effect a desired angular displacement thereof. The tube 25 also serves as a journal bearing for the jet inboard wheel 15' which is laterally spaced from wheel 15. Wheel 15', similar to wheel 15 with two exceptions soon to be noted, is comprised of a wheel rim 17' about which is mounted a mud tire 18', and is journaled to or otherwise rotatably carried by tube 25 which extends through central hub 23'. In other words, wheel 15' is not directly driven by axle 14 but rather by means hereinafter described. The hub plate of wheel 15' is likewise provided with vanes 21', 22' which form an axial flow impeller. Here, however, the vane inclination relative to direction of wheel rotation is the opposite of that of the outboard impeller since the direction of water flow through wheel 15' is outward or away from hull 10 rather than inward.

A drumlike or cylindrical-form pressure casing member, denoted generally by numeral 26, is disposed between wheels 15 and 15'. Casing 26 comprises a peripheral wall 27 encompassing and coaxially disposed about axle 14 and tube 25, and a transverse central baffle plate 28 extending completely across the interior of the casing and connecting with a central annular collar member 29. Tube 25 extends through collar 29 and the casing member is secured thereto by set screws 30. Casing 26 is provided with opposing open ends 31 and 31' which are closely adjacent to and in fluid communication with the impeller means of wheels 15 and 15' respectively. Annular seal rings 32 and 32', which may be composed of polytetrafluoroethylene silicone rubber or other suitable autolubricant material, are disposed between the exterior surface of casing 26 and wheel rims 17 and 17'; the seal rings are retained in place by lips or flanges 33, 33' projecting radially from the circumferential wall 27 of casing 26. In lieu of a solid seal between the pressure casing and the wheel rims, one may employ a liquid filled centrifugal seal, or one may omit a positive seal altogether if the clearance is made sufficiently small inasmuch as a minor amount of leakage can be tolerated without detrimental effect on overall pump efficiency. It will be seen that the central baffle plate 28 divides the pressure casing into two separate pressure chambers. For each pressure chamber, there is provided a jet discharge orifice or opening through peripheral wall 27, such opening facing in a generally rearward direction relative to the line of travel of the vehicle. In other words, there are two jet discharge openings in the peripheral wall 27 spaced apart on either side of baffle 28 each communicating with a respective one of the chambers. One such opening 34' is visible in FIG. 5, the same being operative in combination with impeller means of inboard wheel 15'. As indicated by the large arrows in FIG. 5, the direction of the resulting water jet may be varied up or down by means hereinafter described. The jet discharge opening itself may be round, square, rectangular to it may further comprise a convergent nozzle, a convergent-divergent nozzle or the like.

It has previously been noted that inboard wheel 15' is not directly coupled to the drive axle 14. Powered rotation of wheel 15' is effected by way of a plurality of circumferential rods or struts 35 connecting the rim or hubplate of wheel 15 with the rim or hubplate of wheel 15', such struts being spaced radially outwardly a short distance from pressure casing 26. Thus, positive rotation of wheel 15 will also effect rotation of wheel 15'.

Axle 14 and coaxially mounted tube 25 are both extended inwardly through the wall of vehicle body 10. The inner end of tube 25 is provided with a swaged out end portion 36 to accommodate and retain a journal bearing 37 for axle 14. The tube-axle assembly is taken through rubber packing 39 contained in a stuffing box 40 in order to seal the hull 10 against entrance of water. The use of resilient rubber packing 39 also permits the drive wheels to move forward and backward to a certain degree which will assist the vehicle in rocking back and forth should it become stuck in mud.

The inner end 36 of tube 25 is connected to a C-shaped yoke member 38. Yoke 38 is likewise connected to a similar tube member operatively associated with right-hand drive wheels 16 and 16'. Drive wheels 16 and 16' incorporate a jet propulsion system identical to that described for wheels 15 and 15'. As shown in FIGS. 1 and 2, there is provided a forwardly located jet elevation control lever 41 in a position convenient to the driver of the vehicle. Lever 41 is connected to operating rod 42 by pin 43. Operating rod 42 is pivotally connected to yoke 38 by pin 44. It will be evident that movement of lever 41 forward or backward will cause a corresponding forward and backward motion of yoke 38 which in turn effects the desired degree of rotation of pressure casing mounting tube 25 and thus also of pressure casing 26 and the two jet discharge openings operatively associated with wheels 15 and 15'. A like movement will be imparted to the jet discharge openings associated with wheels 16 and 16'. Thus, the jet control lever 41 is operative to vary in synchronism the angular positions of both pressure casing means of propulsion units 15–15' and 16–16' whereby the direction of jet discharge of the resulting spaced apart jets may be simultaneously elevated above the horizontal and/or depressed below the horizontal in equal degree. Control lever 41 may be locked in a preselected position by way of a ratchet device 45 (FIG. 2).

Another embodiment of my invention is found in FIG. 6, illustrating a single chamber pressure casing construction suitable for use with a single drive wheel, in this example, right front drive wheel 56. Wheel 56 is comprised of a hub 59 and wheel rim 57 upon which is mounted a mud tire 58. Front drive axle 54 engages central hub 59 which is secured thereto by set screws. The central hub portion of the wheel is provided with vanes or blades 60 forming an axial flow impeller. Positioned immediately inboard of wheel 56 is a pressure casing member 61 comprising a peripheral cylindrical wall 62, a closed endwall 63 and a center collar 64. A pressure casing support tube 65 is slip fitted over axle 54, collar 64 in turn being fitted over tube 65 and secured thereto by way of setscrews 66. The open end 67 of casing 61 is closely adjacent to and in fluid communication with the impeller means whereby the casing will receive the lateral discharge of the impeller. An annular seal ring 68 is disposed between the exterior surface of peripheral wall 62 and wheel rim 57, said seal ring being retained in place by annular lip 69. A rearwardly directed jet discharge orifice 70, formed in peripheral wall 62, completes the essential elements of this embodiment. Pressure casing mounting tube 65 may be permanently secured to the vehicle frame or body (by means not shown) so that orifice 70 is always facing in a horizontal rearward direction or, alternatively, tube 65 may be operatively connected to a jet elevation control lever (not shown) similar to lever 41.

To illustrate the operation of my invention, let it be assumed that it is desired to propel the amphibious craft forward in relatively deep water. Jet control lever 41 is advanced to and locked in a position such that the pressure casing 26 is angularly displaced +30°, i.e., the two jet discharge openings associated with wheels 15, 15' point upwardly along a line which makes an angle of 30° with the horizontal. The jet openings associated with wheels 16, 16' also point upwardly 30°. The transmission is placed in a forward gear and the engine is brought up to a speed corresponding to a land speed of about 40 m.p.h. Water is drawn in from the outside of left outboard wheel 15 and discharged into the left-hand compartment of pressure casing 26. Similarly, water is drawn in from the inside of left inboard wheel 15' and discharged into the right-hand compartment of pressure casing 26. A similar action is provided by the pressure casing/impellers combination associated with right-hand drive wheels 16 and 16'. It will be observed that pressure casing support tube 25 permits the pressure casing 26 to be fixedly positioned at a predetermined angle which is independent of the rotation of axle 14 and wheels 15, 15', inasmuch as the axle and wheels are freewheeling relative to said support tube. The net thrust vector generated by the two spaced apart pairs of water jets acts forwardly and downwardly upon the rear axle, causing the stern of the craft to be depressed and the bow to be elevated, thus achieving the desired planing angle which is optimum for the forward speed of the craft. If it is desired to beach the craft onto a steep riverbank, the pressure casings may be rotated still more upwardly, say to +60°. The bow of the craft will then be more severely elevated so as to clear the land bank and permit the front tires to gain early traction. Still further, if the craft should run aground or become bogged in mud, the operator will be able to free it easily by maintaining engine power and periodically rotating the pressure casings up and down about the horizontal at a frequency equaling or approximating the natural pitch frequency of the craft. This maneuver will induce a substantial pitching or rocking motion which, coupled with a net forward driving force, will enable the craft to clear the obstruction and to regain either tire traction or jet-propelled movement depending on depth of water. While the foregoing procedures have been discussed specifically with reference to the rear drive unit, it will be understood that the operation of the front drive unit is analogous. Since the thrust vector then acts forwardly of the center of gravity, the attitude of the craft as a function of angular position of the jets will obviously be the reverse of that effected by the rear drive unit.

While I have thus described the preferred embodiments of my invention, it will be understood that many variations thereof are possible and are included within the broad scope of my invention. For example, to preclude air binding of the pumps in the event the impellers are run partially submerged, one or more weepholes or vents may be drilled in the upper portion of the pressure casing member. Relative to the prime mover, instead of a common engine driving all wheels, one may employ a plurality of individual hydraulic or electric motors with one such motor for each drive wheel. This will allow independent adjustment of impeller speeds so that the jets will have a turning capability as well as rectilinear motion capability. Alternatively, means may be provided to selectively disconnect any one or more of the several driven axles from the prime mover or from the drive wheels so that, again, the water jets produced by the remaining driven wheels will be effective to turn the vehicle in the desired direction while water borne. Although I have illustrated a simple mechanical linkage for rotating the pressure casings, it will be obvious to those skilled in the art that equivalent operation can be obtained by utilizing hydraulic, pneumatic or electric servo positioners, operatively connected to tubes 25, which may be controlled from a console in the driver's compartment.

I claim as my invention:

1. Propulsion means for an amphibious vehicle comprising a vehicle wheel including a tire and a central hub portion; a driven axle member operatively associated with said wheel; means connecting said wheel with said axle member; said hub portion being constructed and arranged to form an axial flow impeller means in the annular space between said tire and said axle whereby, when said hub portion is submerged in water and said wheel is rotated in a given direction, water will be drawn in from one side of the wheel and discharged to the other side thereof and into a pressure casing member as hereinafter defined; a pressure casing member positioned on said other side of the wheel, said casing member having (a) an at least partially open end which is closely adjacent to and in fluid communication with said impeller means, (b) a peripheral wall encompassing the axis of rotation of said wheel and (c) a closed end spaced from said open end; a jet discharge opening in said peripheral wall facing in a generally rearward direction relative to the line of travel of said vehicle; and means connecting with and supporting said casing member such that the latter is fixedly positioned independent of the rotation of said axle member and said wheel.

2. The propulsion means of claim 1 further characterized in the provision of means to vary the angular position of said casing member whereby the direction of jet discharge from said opening may be elevated above the horizontal and/or depressed below the horizontal.

3. Propulsion system for an amphibious vehicle comprising two propulsion means as defined in claim 1 disposed on opposite sides of said vehicle and about a common axis of revolution.

4. The propulsion system of claim 3 further characterized in that said two propulsion means are located at the rear of said vehicle.

5. The propulsion system of claim 3 further characterized in that said two propulsion means are located at the front of said vehicle.

6. The propulsion system of claim 3 further characterized in the provision of means to vary in synchronism the angular positions of both pressure casing members of said two propulsion means whereby the direction of jet discharge of the resulting spaced apart jets may be simultaneously elevated above the horizontal and/or depressed below the horizontal in equal degree.

7. Propulsion means for an amphibious vehicle comprising a first vehicle wheel including a tire and a central hub portion; a driven axle member connecting with the center of said first wheel; a tube member coaxial with and slip fitted over said axle member; a second vehicle wheel including a tire and a central hub portion journaled to said tube member and spaced inwardly from said first wheel; strut means connecting said first and second wheels whereby rotation of the first wheel will effect rotation of the second wheel; the hub portion of said first wheel being constructed and arranged to form a first axial flow impeller means in the annular space between said tire and said axle whereby, when said hub portion is submerged in water and said first wheel is rotated in a given direction, water will be drawn in from the outside of said first wheel and discharged to the inside thereof and into a pressure casing member as hereinafter defined; the hub portion of said second wheel being constructed and arranged to form a second axial flow impeller means in the annular region between said tire and said tube member whereby, when said hub portion is submerged in water and said wheel is rotated in the same direction as said first wheel, water will be drawn in from the inside of said second wheel and discharged to the outside thereof and into a pressure casing member as hereinafter defined; a pressure casing member positioned between said first and second wheels and supported by and fixedly connected to said tube member, said casing member having (a) at least partially open ends which are closely adjacent to and in fluid communication with said first and second impeller means respectively, (b) a peripheral wall encompassing said tube and axle members and (c) a transverse baffle member extending across the interior of said casing member dividing the latter into two separate chambers; two jet discharge openings in said peripheral wall spaced apart on either side of said baffle member each communicating with a respective one of said chambers and facing in a generally rearward direction relative to the line of travel of said vehicle; and jet elevation control means operatively connecting with said tube member to effect incremental predetermined rotation of the latter which in turn varies the angular position of said casing member whereby the direction of jet discharge from said openings may be elevated above the horizontal and/or depressed below the horizontal.

8. Propulsion system for an amphibious vehicle comprising two propulsion means as defined in claim 7 disposed on opposite sides of said vehicle and about a common axis of revolution, said jet elevation control means being adapted to vary in synchronism the angular positions of both pressure casing means of said two propulsion means whereby the direction of jet discharge of the resulting spaced apart jets may be simultaneously elevated above the horizontal and/or depressed below the horizontal in equal degree.

9. The propulsion system of claim 8 further characterized in that said two propulsion means are driven by a common engine.

10. Propulsion means for a waterborne craft comprising an axial flow impeller disposed externally of the hull of said craft at least partially below the waterline thereof and adapted to rotate in a vertical plane generally parallel with the line of travel of the craft; a driven shaft member operatively associated with said impeller; a pressure casing member positioned on the discharge side of the impeller, said casing member having (a) an at least partially open end which is closely adjacent to and in fluid communication with said impeller, (b) a peripheral wall encompassing the axis of rotation of said impeller and (c) a closed end spaced from said open end; a jet discharge opening in said peripheral wall facing in a generally rearward direction relative to the line of travel of said craft; and means connecting with and supporting said casing member such that the latter is fixedly positioned independent of the rotation of said shaft member and said impeller.

11. The propulsion means of claim 10 further characterized in the provision of means to vary the angular position of said casing member whereby the direction of jet discharge from said opening may be elevated above the horizontal and/or depressed below the horizontal.

12. Propulsion system for a waterborne craft comprising two propulsion means as defined in claim 10 disposed on opposite sides of the hull of the craft and about a common axis of revolution.